Patented Oct. 3, 1939

2,175,092

UNITED STATES PATENT OFFICE 2,175,092

POLYMERIZED NITRILES AND PROCESSES OF PREPARING THE SAME

Anderson W. Ralston, Chicago, Ill., assignor to Armour and Company, Chicago, Ill., a corporation of Illinois No Drawing. Application July 27, 1936, Serial No. 92,943

10 Claims. (Cl. 260—404)

This invention relates to polymerized nitriles and processes of preparing the same and it comprises as new materials, the reaction products obtained by subjecting aliphatic nitriles to the action of polymerizing catalysts such as aluminum chloride, phosphorous trichloride, sulfur monochloride, and other catalytic agents having the property of polymerizing; and it further comprises processes wherein such aliphatic nitriles are treated with a polymerizing catalyst and the polymerized nitriles recovered.

The aliphatic nitriles, that is to say, those organic compounds having the general formula RCN, wherein R is an alkyl radical, are substances which are now of considerable economic significance in the arts. These compounds can be made readily from the abundant fats and fatty acids by processes which have been described in recently issued patents. Likewise, higher fatty acid nitriles, such as those obtained from higher fatty acids having ten or more carbon atoms, can be cracked to yield fatty acid nitriles of lower molecular weight, namely those nitriles containing five or more carbon atoms.

I have now discovered that the aliphatic nitriles can be polymerized to form oily or greaselike materials having many uses. For example, they can be used as dielectrics. All of these polymerized products contain nitrogen but they are quite stable compounds and do not tend to hydrolyze or react with moisture. For this reason the polymerized nitriles of the present invention are substances which are substantially inert chemically in most relations.

In broadest aspects by invention comprises processes wherein an aliphatic nitrile advantageously one containing at least five carbon atoms, is subjected to the action of a polymerized catalyst. There are many catalytic materials which are classed as polymerizing agents. Among them are aluminum chloride, zinc chloride, iron chloride, tin chlorides, the chlorides of sulfur and phosphorous, ordinary elemental sulfur itself, phosphorous pentasulfide, and phosphorous. I have used these polymerizing agents in my process and found them active. Consequently, my invention may be broadly defined as the treatment of the simple aliphatic nitriles having five or more carbon atoms with catalytic materials which convert the nitriles to high boiling, generally viscous oily materials. These polymers boil very much higher than the initial nitrile starting material. In some instances they may contain sulfur or phosphorous when polymerizing agents containing sulfur or phosphorous are used. The chemical constitution of the polymers has not been determined. They are unquestionably highly complex molecules and may be mixtures of various polymerized products.

These polymers are to be distinguished from those polymers, tars etc., and like substances of unknown chemical composition which are obtained when fats or fatty acids are subjected to pyrolysis. All of the substances of the present invention contain nitrogen which is, of course, not true of polymers and resins from fatty acids.

In more specific aspects the process of the present invention includes reacting the aliphatic nitrile with the polymerizing agent in the presence of an inert solvent. And in still more specific aspects I can react the nitrile with an aromatic constituent such as benzene, naphthalene, or anthracene in the presence of aluminum chloride to give polymerized materials useful in the arts. In fact, certain modifications of my invention follow the steps of a Friedel-Craft reaction in that the nitrile is polymerized in the presence of aluminum chloride and a solvent, the reaction product hydrolyzed to remove aluminum, and the oily viscous reaction product thus obtained separated from the reaction mixture, washed, and dried.

Before describing specific embodiments of my invention, I wish to point out that by the term fatty acid nitrile, or aliphatic nitrile, I mean to include those nitriles having the general formula RCN wherein R is an alkyl group having at least four carbon atoms so that the nitrile itself is one containing at least five carbon atoms. I can start with any aliphatic nitrile having five or more carbon atoms. For example, I can use butyronitrile, capronitrile, caprylo, capri, lauro, myristo, palmito and stearonitrile or various mixtures thereof. All of these nitriles can be prepared from the corresponding fatty acids. I can also use nitrile mixtures obtained by cracking nitriles of relatively high molecular weight, such as palmito, and stearonitrile. Methods of obtaining such cracked mixtures have been described in prior patents.

In order to keep the description of the present invention within reasonable bounds, I shall restrict the specific examples to a few representative nitriles or nitrile mixtures and I will also restrict the polymerizing agent to aluminum chloride.

I put 133 parts by weight of a nitrile mixture, boiling from about 338° C. to 346° C., and composed of palmito and stearonitrile, in a suitable reaction vessel provided with stirring means and a reflux condenser. One hundred and thirty-three parts by weight of anhydrous aluminum chloride are added slowly over a period of about one and a half hours. After all of the polymerizing agent has been added, the mixture is then heated at a temperature of about 110° C. over a period of about twenty hours. The reaction product is then admixed with ice and hydrochloric acid to hydrolyze the product and finally the hydrolyzed mixture is treated with steam. The steam distillation results in the complete decomposition of any complex aluminum chloride compound and the desired reaction product floats as an upper layer on the aqueous lower layer of aluminum chloride. The reaction product is decanted and washed with warm water to free it of any acid. During the reaction, hydrochloric acid is evolved and most probably there is formed some sort of intermediate reaction product analogous to those intermediate products formed in an ordinary Friedel-Craft reaction. It is this intermediate product which is hydrolyzed.

In another example, I treat 133 parts by weight of a mixture of palmito and stearonitriles with 17 parts by weight of aluminum chloride. The reaction mixture is heated at a temperature of about 100° C. for about three hours and then heated at about 175° C. for nine and a half hours. After hydrolyzing with ice and hydrochloric acid the mixture is steam distilled as in the previous example. The product is a rather heavy viscous oil.

In another example I treat 41.5 parts by weight of cracked nitriles made by cracking cottonseed fatty acid nitriles. This nitrile mixture contains some hydrocarbons as well and has a boiling point range of 104° C. to 150° C. The nitriles in the mixture range from butyro through capri. This mixture is treated with 17 parts by weight of aluminum chloride and the reaction mixture heated at 125° C. for about five hours. After hydrolyzing with ice and hydrochloric acid, followed by steam distillation, the resulting product is a heavy viscous oil.

Under similar conditions I treat 90.5 parts by weight of a nitrile-hydrocarbon mixture made by mildly cracking stearonitrile. This contains lauro and myristo nitrile, together with some hydrocarbons and has a boiling point range of 250° C. to 300° C. After adding 17 parts by weight of aluminum chloride and heating at 150° C. to 160° C. for five hours the reaction product is hydrolyzed, steam distilled and separated. The final product I obtain is a brownish fluid oil.

As stated above, I can use an inert solvent. However, I am not certain whether the inert solvent actually takes no part in the reaction. Hydrocarbons, such as kerosene, apparently react to some extent and form polymeric compounds with the nitrile. For example, I mix 133 parts by weight of stearo-nitrile with 50 parts by weight of kerosene. To this I add 67 parts by weight of aluminum chloride slowly and then heat the reaction mixture for twenty hours at a temperature of 150° C. Under these conditions the aluminum compounds, mostly aluminum chloride and tarry materials, form a grayish layer on the surface of the reaction mixture. The whole reaction mixture is filtered and the aluminum residue discarded. The filtrate is a heavy oil substantially free of aluminum.

In still another example I treat 41.5 parts of the cracked nitriles boiling at 104° C. to 150° C. with 133 parts by weight of aluminum chloride. During the addition of the aluminum chloride in this as well as in all other examples, the temperature of the reaction mixture rises considerably and it is best to add the aluminum chloride rather slowly. After the addition of all aluminum chloride, the reaction mixture is heated at 100 C. for five hours. Upon hydrolysis I obtain a dark colored, rather viscous oil.

In still another example, I react 87 parts by weight of nitriles prepared from lard fatty acids with 20 parts by weight of naphthalene and 100 parts of kerosene and 7 parts by weight of aluminum chloride. This reaction mixture is heated at a temperature of about 100° C. for 20 hours and then hydrolyzed. The excess naphthalene and kerosene are removed by steam distillation and the final reaction product is a thick, oily material, most probably the result of polymerizing the nitriles and reaction of the polymerized nitriles with some of the naphthalene.

Under somewhat similar conditions, I react 265 parts by weight of lard fatty acid nitriles with 40 parts by weight of naphthalene and 34 parts by weight of aluminum chloride. After heating at 200° C. for 20 hours I filter the reaction product to free it of the sludge of aluminum chloride. The filtrate is a thick oil.

In another example, I treat 265 parts by weight of lard fatty acid nitriles with about the same quantity of aluminum chloride. After heating at a temperature of about 140° C. for 17 hours the reaction product is hydrolyzed, steam distilled, and separated from the aqueous lower solution of aluminum chloride. This gives me a rather heavy, oily material.

In all the above examples it will be noted that the quantity of aluminum chloride can vary over wide proportions. Likewise the temperature of the reaction can also vary considerably. Consequently, I do not intend to be limited to any specific ratios of aluminum chloride and nitrile nor do I wish to be limited to any specific temperatures.

When using other metal chloride polymerizing catalysts, such as iron or zinc chloride, I can proceed in exactly the same way. With these polymerizing agents, however, I find that there is little tendency for the formation of complex intermediate compounds and all I need do is filter the reaction mixture to free it of the polymerizing agent which usually forms a sludge-like mass.

As noted above, I can also use catalysts or polymerizing agents such as phosphorous trichloride, sulfur monochloride, phosphorous, sulfur, and phosphorous pentasulfide. When using sulfur, for example, I proceed in exactly the same way except that after the reaction is complete, I filter off the excess sulfur if the solution is not too viscous for filtration. If the reaction mixture is quite viscous I find it advantageous to dilute it with kerosene or some light hydrocarbon, filter off the sulfur, and then steam distill to drive off the kerosene. Many of the sulfur-containing and phosphorous-containing polymerizing agents appear to react with the nitriles and form polymers containing sulfur or phosphorous. In some relations, I find it advantageous to prepare polymers which do contain traces of sulfur or phosphorous. Sulfur monochloride catalysts yield rather viscous dark polymers. Phosphorous trichloride yields products resembling mineral oils. Sulfur, alone, likewise gives polymers resembling dark mineral oils of quite high viscosity and a phosphorous pentasulfide catalyst gives a dark brown rather sticky polymer.

Two or more catalysts or polymerizing agents can be used. For example a mixture of sulfur and aluminum chloride gives a viscous polymer resembling a heavy mineral oil.

Having thus described my invention what I claim is:

1. The process which comprises reacting a mixture of cracked higher fatty acid nitriles with aluminum chloride and hydrolyzing the resulting reaction product, said cracked nitriles resulting from the pyrolysis of nitriles of fatty acids of the type occurring as glycerides in fats and fatty oils.

2. The process which comprises reacting stearonitrile with aluminum chloride and hydrolyzing the resulting reaction product, said cracked nitriles resulting from the pyrolysis of nitriles of fatty acids of the type occurring as glycerides in fats and fatty oils.

3. The process which comprises reacting lard fatty acid nitriles with aluminum chloride and hydrolyzing the resulting reaction product.

4. As new products viscous oils obtained by reacting cracked fatty acid nitriles with aluminum chloride and hydrolyzing the reaction product, said cracked nitriles resulting from the pyrolysis of nitriles of fatty acids of the type occurring as glycerides in fats and fatty oils.

5. As new products viscous oils obtained by reacting lard fatty acid nitriles with aluminum chloride and hydrolyzing the reaction product.

6. As new products viscous oils obtained by reacting stearonitrile with aluminum chloride and hydrolyzing the reaction product.

7. The process which comprises reacting with aluminum chloride an aliphatic nitrile chosen from the group consisting of nitriles of saturated fatty acids having at least five carbon atoms and nitriles of unsaturated fatty acids of the type occurring as glycerides in fats and fatty oils, and hydrolyzing the reaction product.

8. The process which comprises reacting with aluminum chloride and an aryl hydrocarbon an aliphatic nitrile chosen from the group consisting of nitriles of saturated fatty acids having at least five carbon atoms and nitriles of unsaturated fatty acids of the type occurring as glycerides in fats and fatty oils, and hydrolyzing the reaction product.

9. As new products viscous oils obtained by reacting with aluminum chloride an aliphatic nitrile chosen from the group consisting of nitriles of saturated fatty acids having at least five carbon atoms and nitriles of unsaturated fatty acids of the type occurring as glycerides in fats and fatty oils, and hydrolyzing the reaction product.

10. The process as in claim 8 wherein the nitriles are lard fatty acid nitriles.

ANDERSON W. RALSTON.